Jan. 28, 1964  J. G. RAYNIAK  3,119,418
METHOD OF MANUFACTURING CHAIN SAW BARS AND PRODUCT
Filed April 25, 1960

INVENTOR.
JOSEPH G. RAYNIAK
BY
Wheeler, Wheeler & Wheeler
ATTORNEYS

United States Patent Office 3,119,418
Patented Jan. 28, 1964

3,119,418
METHOD OF MANUFACTURING CHAIN SAW
BARS AND PRODUCT
Joseph G. Rayniak, Waukegan, Ill., assignor to Outboard Marine Corporation, Waukegan, Ill., a corporation of Delaware
Filed Apr. 25, 1960, Ser. No. 24,604
4 Claims. (Cl. 143—32)

This invention relates to a method of manufacturing chain saw bars and to the resulting product of the method.

In the past, chain saw blades or bars have been made either by cutting into the perimeter of a solid piece of metal to provide a guide channel for the links of the saw, or such bars have been assembled by riveting or spot welding together three plates of corresponding outline but differing area, the smaller plate being laminated between a pair of substantially identical outer plates to form the bar and to provide the channel in which the saw links are guided.

Both the spot welding and the riveting operations heretofore employed in assembling a laminated chain saw bar have, over a period of years, proved to be relatively expensive and unsatisfactory in that there is considerable tendency for a laminated bar assembled by these methods to become distorted in the process of manufacture, requiring time-consuming corrective measures.

The present invention contemplates the manufacture of saw chain bars by brazing procedures with or without supplemental riveting. While brazing, as a procedure of assembling, has long been known, it has not been apparent that brazing would be satisfactory as a method of laminating together the three plates required in the production of a saw chain bar. It has been found that this procedure is not only satisfactory but has many important advantages in addition to economies in production. If it be desired, in certain instances, to supplement the brazing operation by using rivets to connect the laminated plates, the use of rivets can be limited to the free end tip portion of the bar, it being found that rivets used only at the tip do not create distortion problems such as are experienced where the rivets are applied throughout the length of the bar.

Not only does brazing produce a superior product much more cheaply than is possible otherwise but it is found that a brazed bar can be straightened, when damaged in use, with much greater facility than is possible when the plates have been laminated together with rivets or spot welding. Moreover, whereas the riveted or spot welded bars must be manufactured individually, it is possible to produce a substantial number of such bars concurrently by a single operation in a brazing furnace, with corresponding economies in time and labor. The several assemblies are stacked, one upon another, and subjected to compression between upper and lower platens. Desirably, a copper stop-off paste is used to separate the assemblies from each other. This is a type of masking paste frequently employed in metal working. Ordinary paper interposed between the sets of plates will space them despite the fact that the paper will char in the brazing process. The paste is preferred because the carbonized paper causes an undesirable reaction.

While no doweling is required, dowels may optionally be used for the accurate positioning of the several plates constituting the respective sets.

Figure 1:
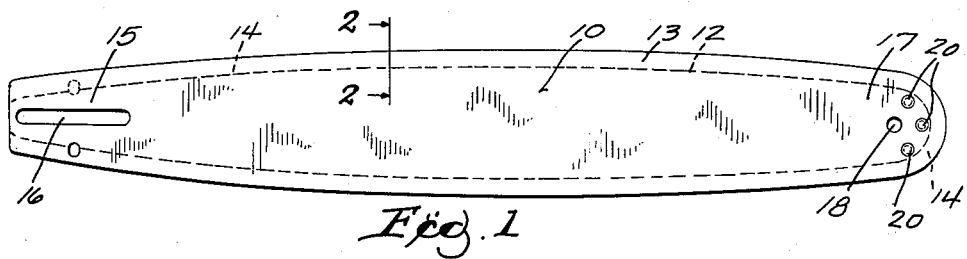
FIG. 1 is a plan view of a chain saw bar or blade embodying the invention.

The chain saw bar 10 is of a conventional form. It comprises three plates 11, 12 and 13 of generally corresponding outline but of different area laminated together to provide a channel at 14 which is substantially continuous about the perimeter of the bar to receive and guide portions of the links of the saw chain (not shown). As is apparent, the plates 11 and 13 are desirably identical in area, the plate 12 being of smaller area to provide the channel 14.

The end portion 15 of the bar has an elongated slot at 16 to receive the bolts which fasten the bar to the power head. The power head and the saw chain being conventional, neither is illustrated. The free end portion 17 of the bar is curvilinear concentrically with a hole 18 which opens completely through the bar.

Figure 2:
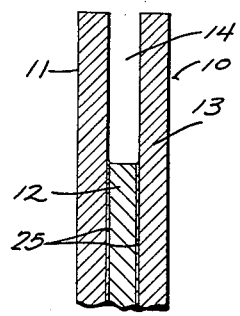
FIG. 2 is an enlarged fragmentary detail view taken in section on the line 2—2 of FIG. 1.
Figure 4:
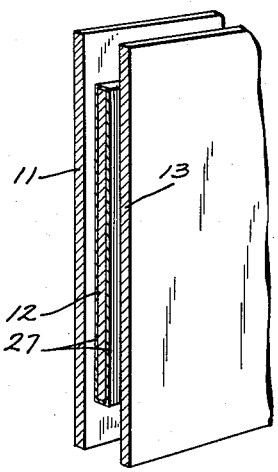
FIG. 4 is a fragmentary detail view in perspective showing the partially separated plates of the bar, the central plate having been copper-plated preliminary to brazing.

Instead of being dependent upon rivets or spot welds for connection, the several plates 11, 12 and 13 are desirably connected by brazing at 25 (FIG. 2). The brazing is desirably done in a furnace such as that fragmentarily illustrated at 26 in FIG. 5. The temperatures may exceed 2000° F. It is broadly immaterial how the copper or copper alloy used for brazing is introduced between the plates. FIG. 4 shows the central plate 12 plated on both faces with a coating 27 of copper or copper alloy. The copper-plated lamina 12 is positioned between the outer plates 11 and 13 and the assembly is subjected to moderate pressure. When the assembly is exposed to brazing temperatures, the copper or copper alloy melts and flows by capillary action throughout the area of contact. Upon cooling, the copper bonds the several plates securely together to comprise the desired bar.

Figure 3:
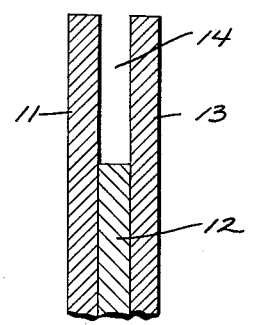
FIG. 3 is a view comparable to FIG. 2 showing the preferred means of introducing the brazing material in the form of a slug inserted in an aperture in the intermediate lamina.

FIG. 3 shows the copper introduced in the form of a slug 28 laid into one of a number of apertures 28' provided for the purpose in the central lamina 12 between the face plates 11 and 13. Capillary attraction draws the melted copper or copper alloy between the several plates in the brazing furnace. When the plates cool, they will be securely brazed together.

Figure 6:
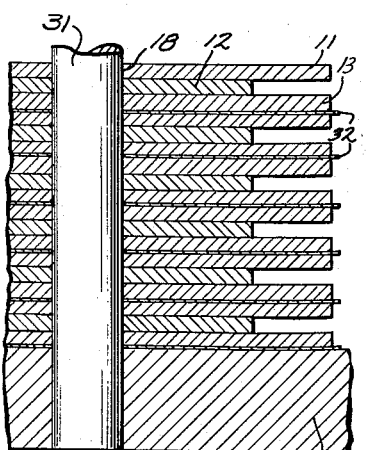
FIG. 6 is an enlarged fragmentary detail view showing some of the assemblies in section and illustrating the optionally usable aligning dowels and the stop-off paste which intervenes between the plate assemblies.
Figure 5:
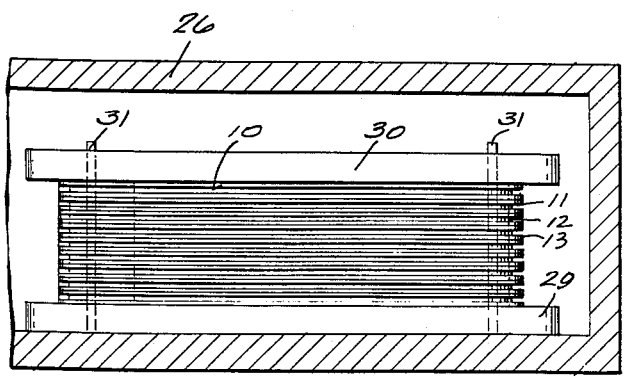
FIG. 5 is a view in side elevation of plate assemblies laminated between upper and lower platens preliminary to introduction into a brazing furnace.

FIGS. 5 and 6 show a number of plate assemblies superimposed upon each other upon a lower platen 29 which provides a smooth supporting surface, and beneath an upper platen 30, the weight of which maintains the plates in sufficient pressure contact to assure capillary distribution of the molten brazing material and to maintain flatness of the plates throughout the heating and cooling cycle. While various means can be employed for maintaining registration of the plates and their respective assemblies, in the disclosed method dowels are used as shown at 31, the dowels passing through the registering holes 18 and slots 16 of successive bar assemblies to maintain the plates in accurate registration. The plates comprising one assembly are separated from the platen and from the plates of other assemblies by means of paper indicated at 32.

There are various other known procedures for introducing brazing material, but the two procedures shown are preferred exemplifications of possibilities in this regard. The brazing provides a continuous connection between the laminae which is coextensive with the central lamina 12. Such a continuous connection is materially stronger, particularly along the elongated sides of the bar, than the localized connection which can be provided by spaced rivets.

Because of the assembly of the bar components in face contact and subject to some pressure, there is little or no tendency for the plates to warp in the course of the brazing treatment. There being no warpage and no roughness such as results both from riveting and from spot welding, the finishing operation is very simple as compared with the requirements when other assembling procedures are used.

Three rivets 20 may optionally be used between the hole 18 and the concentric surface provided by the margin of the inner lamina 12 at the bottom of channel 14. The rivets are illustrated in FIG. 1. Because they are few in number and because of their location, they do not tend to warp the bar.

The rivets perform no function in normal use of the bar but are of advantage if the bar becomes damaged. The saw chain bars are not infrequently subject to damage because of pinching which restricts the channel 14 in which the saw chain links are guided. Because the brazing operation leaves the plates of the bar substantially free of stress throughout their length, it is much easier to straighten the projecting margins of the blades 11 and 13 than is the case if the several blades have been secured together by riveting or spot welding. The connection between blades is continuous and there is little or no tendency to produce a wavy edge in consequence of the straightening effort. Thus, the present invention results in a superior blade or bar, as well as effecting considerable economies in manufacture.

However, if the bar becomes pinched at its end, the application of straightening force has a tendency to separate the laminations. The rivets provide reinforcement which resists such separation.

I claim:

1. A method of manufacturing chain saw bars which comprises fabricating, for each bar, a pair of face plates each having a rounded end of generally similar curvature, and an intermediate plate which is of lesser area than said face plates and which has a rounded end of correspondingly less radius than the rounded ends of the face plates, providing the plates with means for registration therebetween to align the rounded ends of the face plates and to locate the rounded end of the intermediate plate in inwardly spaced relation to the rounded ends of the face plates, assembling an intermediate plate between a pair of face plates to form a bar assembly while utilizing the registration means to dispose said plates as aforesaid, stacking a series of said assemblies in spaced relation to each other while maintaining the plates of the several assemblies in registration, heating the stack of assemblies while exposing contacting portions of the plates in each assembly to a brazing compound, continuing such heating until the plates are heated to a temperature at which the brazing compound melts and flows by capillarity between the plates of the several assemblies, cooling the plates of the several assemblies, and separating the assemblies from each other.

2. As a new article of manufacture, an elongated chain saw bar comprising a pair of face laminae each having a rounded end of similar curvature, and an intermediate lamina having a rounded end which extends curvilinearly about a predetermined center and which is spaced inwardly of said rounded ends of said pair of laminae, said intermediate lamina being in brazed connection with said pair of laminae throughout substantially the entire area of said intermediate lamina and having no connection with said pair of laminae other than the brazed connection along a major portion of the length of said bar extending on the side of said center opposite from said rounded ends, and a rivet supplementing said brazed connection solely in the area between said center and said rounded end of said intermediate lamina.

3. The method recited in claim 1 in which the plates of each bar are elongated and including the further step of providing a riveted connection between the several plates, such connection being limited to the space within the rounded end of the intermediate plate and between the margin of the rounded end and the center near the said end about which such margin is curvilinear.

4. As a new article of manufacture, an elongated chain saw bar comprising a pair of face laminae each having a rounded end of similar curvature, and an intermediate lamina having a rounded end which is spaced inwardly of said rounded ends of said pair of laminae, and a brazed connection between each of said face laminae and said intermediate lamina substantially throughout the entire area of said intermediate lamina, said brazed connections constituting the sole connection between said laminae along a major portion of the length thereof.

References Cited in the file of this patent

UNITED STATES PATENTS

| | | |
|---|---|---|
| 440,847 | Meyer | Nov. 18, 1890 |
| 2,483,934 | Richardson | Oct. 4, 1949 |
| 2,794,458 | Dosker | June 4, 1957 |
| 2,838,833 | Richardson | June 17, 1958 |
| 2,845,967 | Hutchinson | Aug. 5, 1958 |
| 2,888,964 | Mall | June 2, 1959 |
| 2,948,309 | Hoff et al. | Aug. 9, 1960 |